(12) United States Patent
Kato (10) Patent No.: US 12,552,344 B2
(45) Date of Patent: Feb. 17, 2026

(54) UNATTENDED COMMODITY SELLING ASSISTANCE SYSTEM USING VEHICLE

(71) Applicant: SUBARU CORPORATION, Tokyo (JP)

(72) Inventor: Hideaki Kato, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 18/595,933

(22) Filed: Mar. 5, 2024

(65) Prior Publication Data

US 2024/0308466 A1 Sep. 19, 2024

(30) Foreign Application Priority Data

Mar. 14, 2023 (JP) ................................. 2023-039527

(51) Int. Cl.
*B60R 25/31* (2013.01)
*B60R 25/10* (2013.01)
*B60R 25/104* (2013.01)
*B60R 25/30* (2013.01)

(52) U.S. Cl.
CPC ........ *B60R 25/1012* (2013.01); *B60R 25/104* (2013.01); *B60R 25/305* (2013.01); *B60R 25/31* (2013.01); *B60R 2025/1013* (2013.01)

(58) Field of Classification Search
CPC . B60R 25/1012; B60R 25/104; B60R 25/305; B60R 25/31; B60R 2025/1013; B60P 3/0257; G06F 21/31; G06Q 30/0201; G06V 10/764; G06V 40/28; G07C 9/00896; G07C 2009/0092; G07F 9/00; G07F 9/023; G07F 9/026; G07F 11/00; G08B 13/196

See application file for complete search history.

(56) References Cited

U.S. PATENT DOCUMENTS

| 10,186,124 B1* | 1/2019 | Mullins .............. G08B 13/1968 |
| 10,552,792 B2* | 2/2020 | Mattingly ................ B65G 1/10 |
| 11,370,391 B1* | 6/2022 | Gammelgard .. B60W 60/00256 |
| 2005/0161420 A1* | 7/2005 | Hardy ..................... A47F 1/125 |
| | | 211/187 |

(Continued)

FOREIGN PATENT DOCUMENTS

JP 2012-133802 A 7/2012

*Primary Examiner* — Nay Tun
(74) *Attorney, Agent, or Firm* — Rimon P.C.

(57) ABSTRACT

An unattended commodity selling assistance system using a vehicle. The vehicle includes a trunk, one or more vehicle mounted cameras, an image data acquisition unit, an identification unit, a notification unit, and a communication device. The trunk is configured to provide room for a commodity. The one or more vehicle mounted cameras configured to capture an image of a surrounding view of the vehicle and an image of an inside view of the trunk. The notification unit is configured to, on the condition that the identification unit identifies an intruder other than a purchaser as being present in the trunk, give an intruder alarm notification. The communication device is configured to, on the condition that the identification unit identifies the commodity as being stolen by the intruder, give a theft notification to a public organization.

5 Claims, 10 Drawing Sheets

(56) References Cited

U.S. PATENT DOCUMENTS

| | | | |
|---|---|---|---|
| 2008/0245811 A1* | 10/2008 | Colelli | G07F 11/42 221/90 |
| 2010/0237091 A1* | 9/2010 | Garson | G07F 11/16 221/226 |
| 2014/0327773 A1* | 11/2014 | Scott-Cook | H04N 7/188 348/148 |
| 2016/0167648 A1* | 6/2016 | James | B60Q 1/507 701/28 |
| 2019/0033856 A1* | 1/2019 | Ferguson | H04W 4/024 |
| 2019/0057342 A1* | 2/2019 | Ferguson | G01C 21/3453 |
| 2019/0061619 A1* | 2/2019 | Reymann | G05D 1/0011 |
| 2019/0197859 A1* | 6/2019 | Kanehara | G06V 20/10 |
| 2019/0303676 A1* | 10/2019 | Costello | G07G 1/0009 |
| 2019/0355193 A1* | 11/2019 | Kirsch | G06V 20/52 |
| 2020/0010051 A1* | 1/2020 | Dumov | H04W 4/48 |
| 2020/0097890 A1* | 3/2020 | Migita | G06Q 10/08 |
| 2020/0238952 A1* | 7/2020 | Lindsay | G06V 30/194 |
| 2020/0276981 A1* | 9/2020 | Anderson | B60W 50/12 |
| 2020/0327759 A1* | 10/2020 | Neiman | G07C 9/28 |
| 2021/0182604 A1* | 6/2021 | Anthony | G08G 1/0141 |
| 2021/0201297 A1* | 7/2021 | Chen | G06Q 20/352 |
| 2021/0224926 A1* | 7/2021 | Kobayashi | G06Q 20/18 |
| 2021/0241010 A1* | 8/2021 | Ogura | B60K 35/22 |
| 2021/0396065 A1* | 12/2021 | Hara | B61D 19/02 |
| 2023/0394382 A1* | 12/2023 | Ishida | G06V 40/20 |

\* cited by examiner

UNATTENDED COMMODITY SELLING ASSISTANCE SYSTEM USING VEHICLE

CROSS-REFERENCE TO RELATED APPLICATIONS

The present application claims priority from Japanese Patent Application No. 2023-039527 filed on Mar. 14, 2023, the entire contents of which are hereby incorporated by reference.

BACKGROUND

The disclosure relates to an unattended commodity selling assistance system using a vehicle.

In recent years, to cope with manpower shortage in retail business, attempts have been made for unattended operation of a store, or unattended selling. As one of such attempts, a proposal has been made for an unattended mobile store using a vehicle. For example, reference is made to Japanese Unexamined Patent Application Publication (JP-A) No. 2012-133802.

In this existing technique, a main body of a store is loaded on a vehicle to form a mobile store. The main body of the store includes doors on a front wall and a rear wall, to allow a user to enter and leave the store. An in-store passage extends linearly from one door to the other door along a commodity display shelf in the main body of the store. The main body of the store further includes an authentication device and a gate device. The authentication device authenticates the user. The gate device permits the user to enter the store or inhibits the user from entering the store based on an authentication result of the authentication device.

SUMMARY

An aspect of the disclosure provides an unattended commodity selling assistance system using a vehicle. The vehicle includes a trunk, one or more vehicle mounted cameras, an image data acquisition unit, an identification unit, a notification unit, and a communication device. The trunk is configured to provide room for a commodity. The one or more vehicle mounted cameras are configured to capture an image of a surrounding view of the vehicle and an image of an inside view of the trunk. The image data acquisition unit is configured to acquire image data on the image captured by the one or more vehicle mounted cameras. The identification unit configured to identify the image data. The notification unit is configured to give a notification to a person in or around the trunk. The communication device is configured to communicate with outside the vehicle. The notification unit is configured to, on the condition that the identification unit identifies an intruder other than a purchaser as being present in the trunk, give an intruder alarm notification. The communication device is configured to, on the condition that the identification unit identifies the commodity as being stolen by the intruder, give a theft notification to a public organization.

An aspect of the disclosure provides an unattended commodity selling assistance system using a vehicle. The vehicle includes a trunk, one or more vehicle mounted cameras, a communication device, and circuitry. The trunk is configured to provide room for a commodity. The one or more vehicle mounted cameras are configured to capture an image of a surrounding view of the vehicle and an image of an inside view of the trunk. The circuitry is configured to: acquire image data on the image captured by the one or more vehicle mounted cameras; identify the image data; cause a notification unit to give a notification to a person in or around the trunk; and cause a communication device to communicate with outside the vehicle. The circuitry is configured to, when identifying an intruder other than a purchaser as being present in the trunk, cause the notification unit to give an intruder alarm notification. The circuitry is configured to, when identifying the commodity as being stolen by the intruder, cause the communication device to give a theft notification to a public organization.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

In the existing techniques, the vehicle includes the main body of the store. The main body of the store includes, for example, the commodity display shelf and the in-store passage. The vehicle further includes the authentication device and the gate device to ensure security. This results in a large amount of capital investment for implementation. In such existing techniques, an owner of the vehicle has to prepare an expensive dedicated vehicle, which makes a high barrier when the owner of the vehicle performs unattended commodity selling with the use of the vehicle owned by the owner themselves.

If commodities are arranged in, for example, a loading space of a general vehicle devoid of store facilities as in the existing techniques, and the commodities are sold unattendedly, it is possible to place the commodities on the vehicle and move the commodities anywhere. This is advantageous for individual-to-individual commodity selling such as a so-called "flea market" (registered trademark). However, for unattended selling of commodities placed on a vehicle, it is desirable to unlock the vehicle unattendedly while ensuring security. Moreover, it is also desirable to take measures to prevent a user from taking inappropriate actions, e.g., taking away an unsettled commodity.

It is desirable to provide an unattended commodity selling assistance system using a vehicle, and a vehicle assisting in unattended commodity selling that make it possible to perform unattended selling of commodities accommodated by the vehicle, with the use of the vehicle owned by an owner themselves, while ensuring security, without incurring an excessive capital investment to the owner of the vehicle.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

Figure 1:
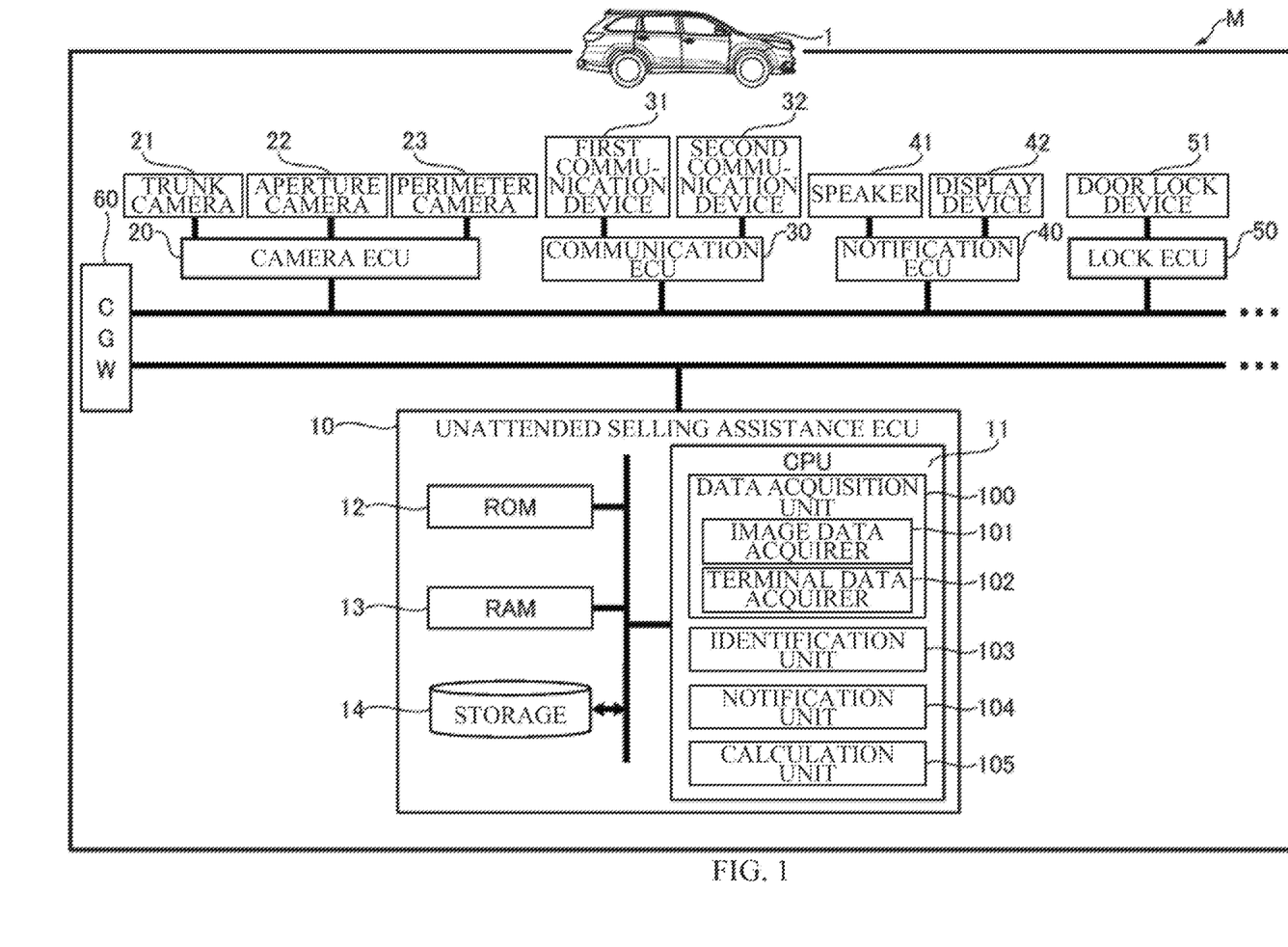
FIG. 1 is a block diagram of in-vehicle ECUs of a vehicle according to an embodiment of the disclosure.

As illustrated in FIG. 1, an unattended selling assistance system M according to an embodiment of the disclosure may include a vehicle 1 and an unattended selling assistance ECU 10 mounted on the vehicle 1. As illustrated in FIGS. 1 to 4, 5A, and 5B, the unattended selling assistance system M according to the embodiment of the disclosure may perform unattended selling of commodities 5 placed in a trunk 7 of the vehicle 1.

On the vehicle 1, multiple in-vehicle ECUs may be mounted. The in-vehicle ECUs may include multiple electronic control units (ECUs) and a central gateway (CGW) 60 that are communicatably coupled to one another by an in-vehicle network. The CGW 60 may be a relay device configured to relay communication between the ECUs and communication between the ECUs and the outside of the vehicle. The in-vehicle ECUs may each include, for example, a processor such as a central processing unit (CPU) or a micro processing unit (MPU), an electric circuit, and a storage element such as a random access memory (RAM) and a read only memory (ROM). Some or all of operation to be performed by the in-vehicle ECUs may be realized by hardware such as an application specific integrated circuit (ASIC), a field-programmable gate array (FPGA), or a graphics processing unit (GPU).

As illustrated in FIG. 1, the unattended selling assistance ECU 10 mounted on the vehicle 1 may include a central processing unit (CPU) 11, a ROM 12, a RAM 13, and a storage 14. The CPU 11 may carry out various kinds of processing based on programs held in the ROM 12. In this embodiment, the CPU 11 may read the programs held in the ROM 12 into a memory such as the RAM 13 and carry out the processing.

The unattended selling assistance ECU 10 may include a data acquisition unit 100. The data acquisition unit 100 may acquire data from a camera ECU 20 and a communication ECU 30. The data acquisition unit 100 may acquire data from the camera ECU 20 by an image data acquirer 101, and acquire data from the communication ECU 30 by a terminal data acquirer 102. The vehicle 1 may include a trunk camera 21, an aperture camera 22, and a perimeter camera 23 as vehicle mounted cameras. The vehicle 1 may include the camera ECU 20 configured to control these cameras. Details of each of the vehicle mounted cameras are described later with reference to FIGS. 2 and 3.

The vehicle 1 may include a first communication device 31, a second communication device 32, and a communication ECU 30. The communication ECU 30 may control the first communication device 31 and the second communication device 32. The first communication device 31 may be provided for, without limitation, communication with an unattended selling assistance system server 4 (see FIG. 7) and acquisition of navigation information when driving. The second communication device 32 may be provided for wireless communication such as ultra-wideband (UWB) and Bluetooth (registered trademark) with information terminals around the vehicle 1. Here, although two kinds of the communication devices having different roles are used, but one kind of communication devices may have these roles.

The unattended selling assistance ECU 10 may include an identification unit 103. The identification unit 103 may identify data acquired by the data acquisition unit 100. In one example, with the use of data regarding commodity registration described later and image data acquired from the camera ECU 20, the identification unit 103 may identify, for example, whether or not an object held by a purchaser 2 is the commodity 5. When the object is the commodity 5, the identification unit 103 may identify, for example, commodity data regarding a commodity 5A held by the purchaser 2, e.g., a name and a price of the commodity 5A. Moreover, with the use of terminal data acquired from the communication ECU 30, the identification unit 103 may identify whether or not an information terminal around the vehicle 1 is registered in the unattended selling assistance system server 4. The identification may be used in authentication of purchaser data. Details of the authentication of the purchaser data are described later with reference to FIG. 9. The vehicle 1 may further include a door lock device 51 and a lock ECU 50. The door lock device 51 may unlock and lock a trunk door 6. The lock ECU 50 may control the door lock device 51. Controlling the lock ECU 50 makes it possible to unlock the trunk door 6 of the vehicle 1 based on a result of the authentication of the purchaser data.

The unattended selling assistance ECU 10 may include a notification unit 104. The notification unit 104 may output a notification signal to a notification ECU 40 based on a result of the identification by the identification unit 103. In one example, when the identification unit 103 identifies the purchaser 2 as holding the commodity 5, the notification unit 104 may output, to the notification ECU 40, the notification signal of the data regarding the commodity 5A held by the purchaser 2 and identified by the identification unit 103, e.g., the data regarding the name and the price of the commodity 5A. When the identification unit 103 fails in identifying the commodity 5A, the notification unit 104 may output, to the notification ECU 40, the notification signal to prompt the purchaser 2 to capture an image of the commodity 5A, and give a notification with the use of a speaker 41, a display device 42, or both of the vehicle 1.

When the identification unit 103 identifies the object held by the purchaser 2 as other than the commodity 5, the notification unit 104 may output, to the notification ECU 40, the notification signal indicating that the held object is an item not for sale, and give the notification with the use of the speaker 41, the display device 42, or both. When the identification unit 103 identifies the purchaser 2 as getting their hand into the trunk 7 while holding their belongings, the notification unit 104 may output, to the notification ECU 40, the notification signal to inhibit the purchaser 2 from getting the belongings of the purchaser 2 into the trunk 7, and give the notification with the use of the speaker 41, the display device 42, or both of the vehicle 1, to prevent the identification unit 103 from malfunctioning or to prevent a malicious purchaser from replacing the commodities 5 with something else.

Moreover, the notification unit 104 may output, to the communication ECU 30, the notification signal related to a notification by the first communication device 31 to the unattended selling assistance system server 4 or to an information terminal 3A of a vendor 3, and a notification by the second communication device 32 to the information terminal 2A carried by the purchaser 2 around the vehicle 1. In addition, the notification unit 104 may output, to the notification ECU 40, the notification signal such as a guidance sound as necessary when the purchaser 2 purchases the commodity 5.

The unattended selling assistance ECU 10 may include a calculation unit 105. The calculation unit 105 may calculate the price of the commodity 5 purchased by the purchaser 2 and identified by the identification unit 103. The calculation unit 105 may also calculate sales for the day or sales for a certain period of time.

Figure 2:
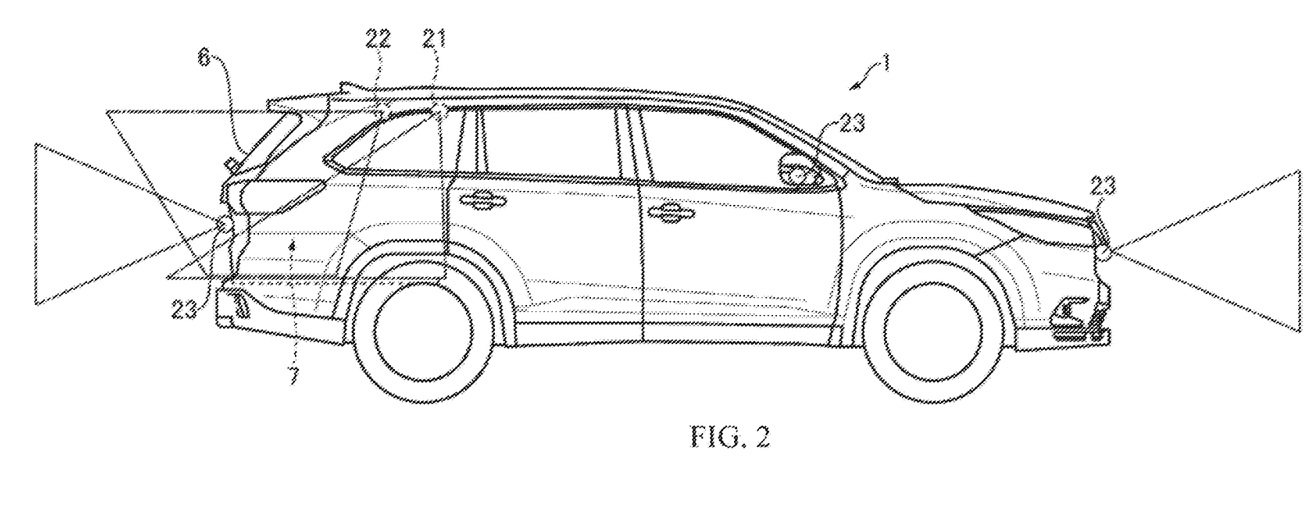
FIG. 2 is a right-side view of the vehicle according to the embodiment of the disclosure, illustrating camera positions and ranges of imaging.
Figure 3:
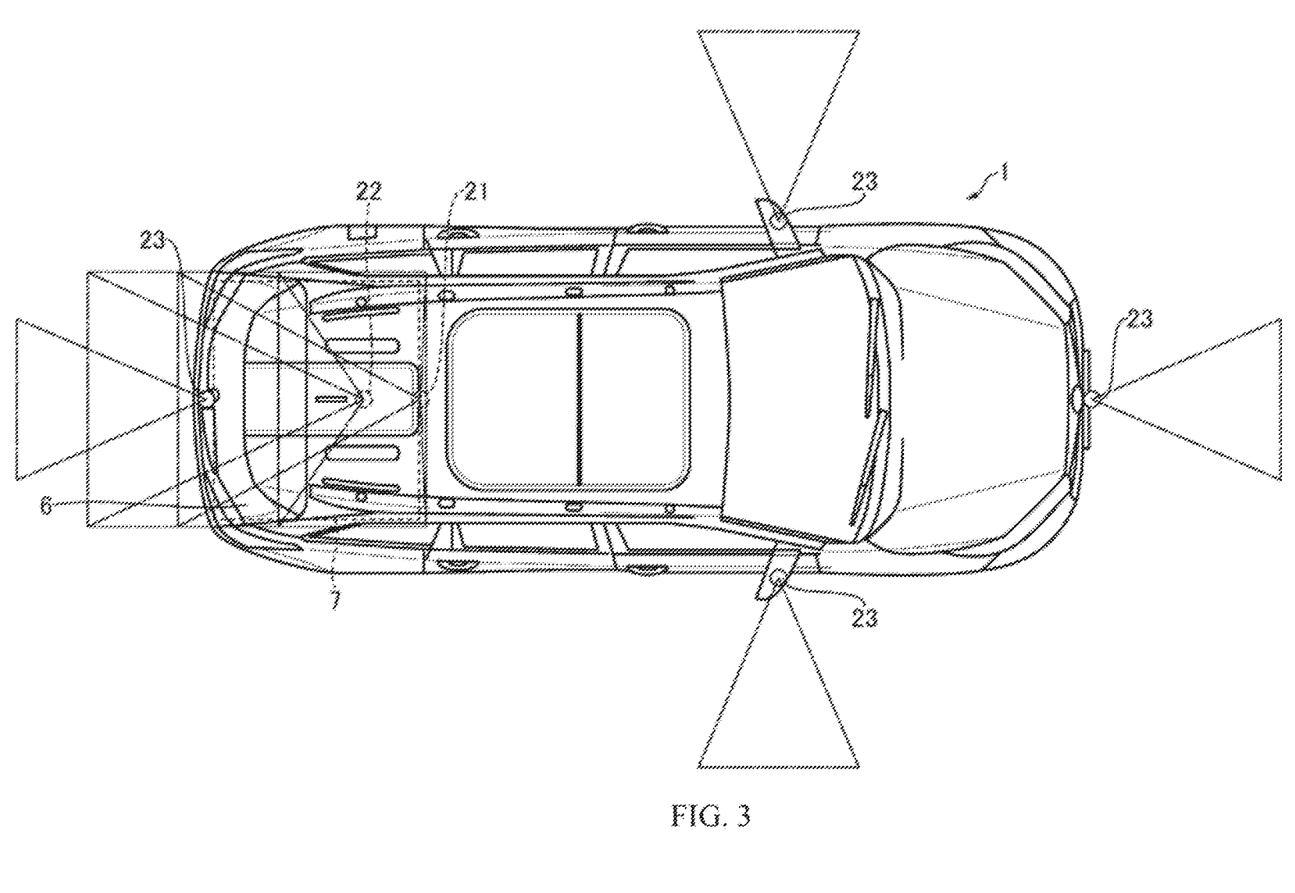
FIG. 3 is a top view of the vehicle according to the embodiment of the disclosure, illustrating the camera positions and the ranges of imaging.

As illustrated in FIGS. 2 and 3, the vehicle 1 may include, as described, the trunk camera 21, the aperture camera 22, and the perimeter camera 23, as the vehicle mounted cameras. The trunk camera 21, the aperture camera 22, and the perimeter camera 23 may be controlled by the camera ECU 20. In this example, the trunk camera 21 and the aperture camera 22 may be provided inside the vehicle 1, and the perimeter camera 23 may be provided outside the vehicle 1.

In FIGS. 2 and 3, ranges indicated by long dashed short dashed lines indicate imaging ranges of the respective vehicle mounted cameras. The trunk camera 21 may capture images of the commodities 5 in the trunk 7 and movements of the hand of the purchaser 2 when the purchaser 2 gets the hand in the trunk 7. The trunk camera 21 may be utilized for an inventory control of the commodities 5. The inventory control of the commodities 5 includes, for example, the identification of the commodity 5A held by the purchaser 2, and prevention of the commodities 5 from being stolen or replaced with something else. The aperture camera 22 may capture images of the purchaser 2 and the surroundings of the purchaser 2. When the purchaser 2 is checking out the commodities 5 in the trunk 7, there is a concern that the rear of the purchaser 2 is unprotected. Thus, by capturing the images of the surroundings of the purchaser 2, in particular, by capturing rearward images behind the purchaser 2, the aperture camera 22 may be utilized for crime prevention. Moreover, the aperture camera 22 may capture images of a portion of the trunk 7 from a different angle from that of the trunk camera 21. By capturing the images of the trunk 7 at the different angle from that of the trunk camera 21, it is possible to enhance accuracy of the identification of the commodity 5A held by the purchaser 2, and to provide further prevention of, for example, the replacement of the commodities 5 with something else by a malicious purchaser. The perimeter camera 23 may capture images of the surroundings of the vehicle 1. The perimeter camera 23 may be utilized for, for example, prevention of theft of the commodities 5 by a person other than the purchaser, and crime prevention around the vehicle 1. The positions of installation of the respective vehicle mounted cameras may be appropriately disposed in accordance with, for example, a shape of the trunk door 6 for each vehicle, but it suffices that the vehicle mounted cameras are installed to allow for the capture of the respective ranges described above.

Figure 4:
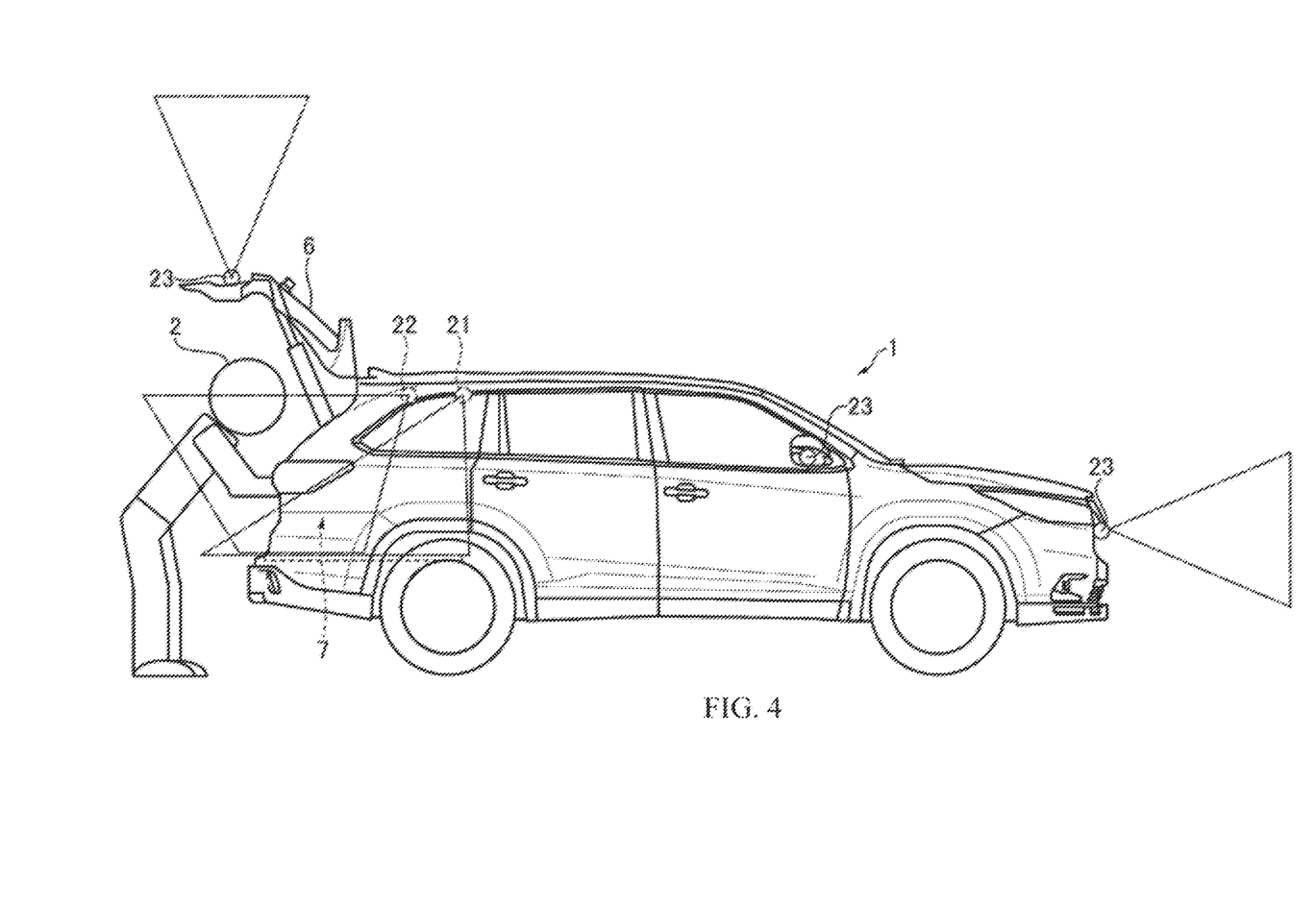
FIG. 4 is a right-side view of the vehicle and a purchaser in the embodiment of the disclosure.
Figure 5A:
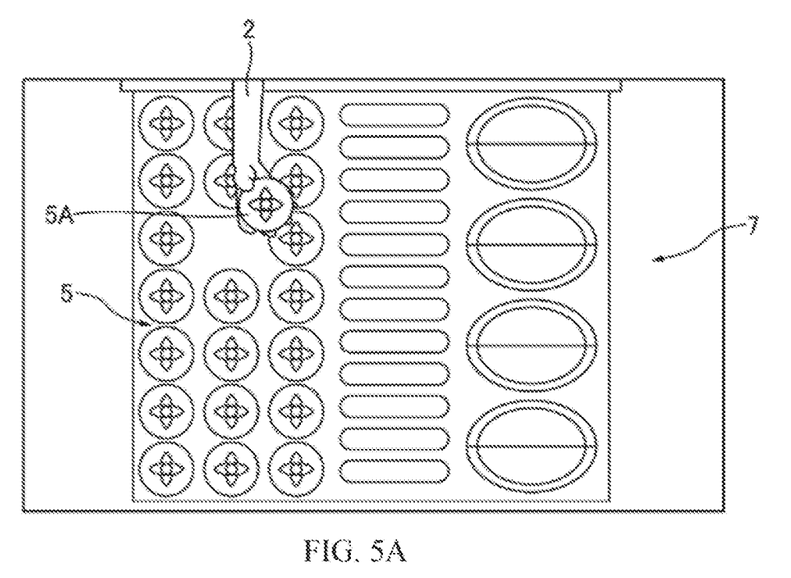
FIG. 5A illustrates the vehicle and the purchaser in an angle of view of a trunk camera in the embodiment of the disclosure.
Figure 5B:
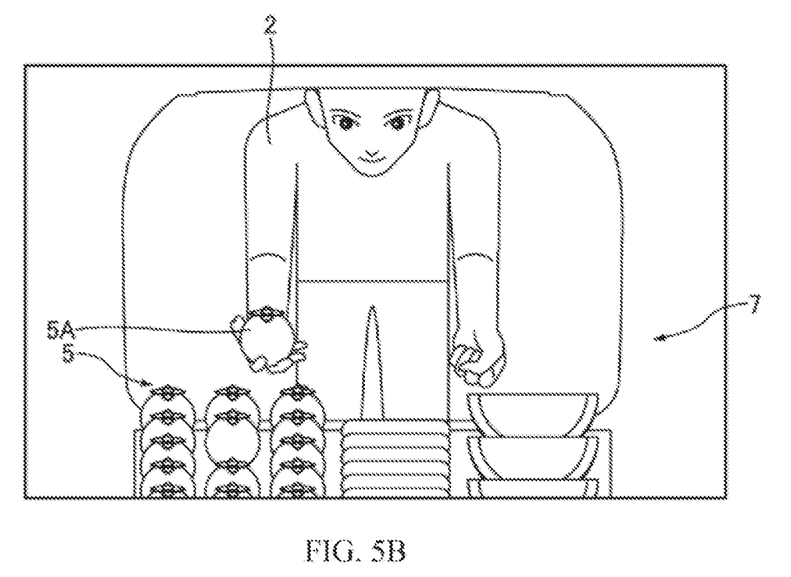
FIG. 5B illustrates the vehicle and the purchaser in an angle of view of an aperture camera in the embodiment of the disclosure.

FIGS. 4, 5A, and 5B illustrate a state of sale by the unattended selling assistance system M. In FIG. 4, the trunk door 6 of the vehicle 1 is open, and the purchaser 2 is getting the hand into the trunk 7. FIG. 5A is an image by the trunk camera 21 in the state in FIG. 4. FIG. 5B is an image by the aperture camera 22 in the state in FIG. 4. As illustrated in FIG. 4, the trunk camera 21 may capture the image of the hand of the purchaser 2 and the commodities 5, and the aperture camera 22 may capture the image of the purchaser 2 and the surroundings of the purchaser 2. The captured image data may be transmitted to the image data acquirer 101 of the data acquisition unit 100.

The image data captured and acquired by each of the vehicle mounted cameras may be subjected to a labeling process and image data integration, and identified by the identification unit 103. For example, the identification unit 103 may subject the image data by the trunk camera 21 in FIG. 5A and the image data by the aperture camera 22 in FIG. 5B to the labeling process, and integrate the image data. This makes it possible for the identification unit 103 to identify which purchaser in FIG. 5B the hand holding the commodity 5A in FIG. 5A belongs to.

Moreover, as described, the aperture camera 22 may capture the images of a portion of the trunk 7 at the different angle from that of the trunk camera 21. For example, sometimes a purchaser hides another commodity 5 under the commodity 5A the purchaser is holding. Sometimes it is difficult to identify the held commodity 5A based on only the image data by the trunk camera 21 because the hand of the purchaser 2 overlaps with the commodity 5A. Even in such cases, the labeling process and the image data integration make it possible to identify the commodity 5A. In other words, even if the commodity 5A is not identifiable by a single camera, it is possible to identify the purchaser 2 or the commodity 5A held by the purchaser 2 by using the multiple cameras and integrating the image data subjected to the labeling process. In the figure, the single purchaser 2 is illustrated, but it is possible to perform the labeling process with two or more purchasers.

Figure 6:
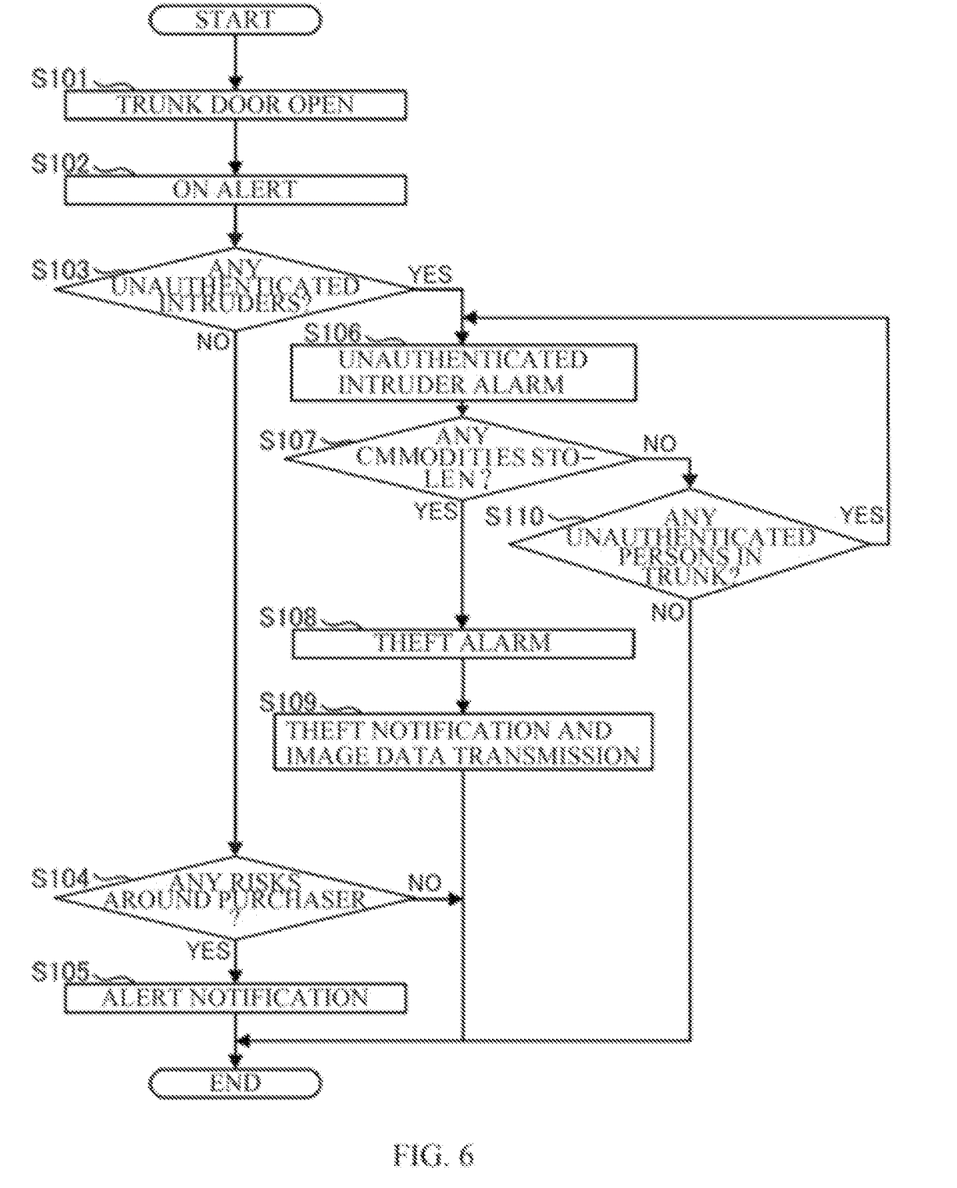
FIG. 6 is a flowchart of crime prevention processing when a trunk door is open in the embodiment of the disclosure.

There is possibility of, for example, a theft of the commodity 5 by a person other than the purchaser 2 while the purchaser 2 opens the trunk door 6 and purchases the commodity 5. With reference to FIG. 6, description is given of a flow of crime prevention processing to be carried out by the unattended selling assistance ECU 10 when the trunk door 6 is open.

While the trunk door 6 is open (step S101), the vehicle 1 is on alert (step S102). When the vehicle 1 is on alert, the images may be captured by the trunk camera 21 and the aperture camera 22, to check presence or absence of any intruders, into the trunk 7, other than a person whose purchaser data has been successfully authenticated. The image data may be subjected to the labeling process and the integration process, and constantly monitored by the identification unit 103 (step S103). When no intruders into the trunk 7 is present (step S103—NO), the aperture camera 22 and the perimeter camera 23 may monitor the surroundings of the purchaser 2 and the vehicle 1, in particular, the rear of the purchaser 2 (step S104). When there is any risk to the purchaser 2 (step S104—YES), an alert notification may be given by using the speaker 41, the display device 42, or both (step S105).

As a result of the labeling process and the integration process on the image data by each of the vehicle mounted cameras, when the identification unit 103 identifies an intruder other than a person whose purchaser data has been successfully authenticated, as being present in or around the trunk 7 (step S103—YES), an unauthenticated intruder alarm may be given by using the speaker 41, the display device 42, or both (step S106). Furthermore, when the identification unit 103 identifies the commodity 5 as being stolen (step S107—YES), a theft alarm may be given by using the speaker 41, the display device 42, or both (step S108). Moreover, a theft notification may be given to the public organization and a manager of the unattended selling assistance system M by using the first communication device 31, and the image data by the vehicle mounted cameras captured at this occasion may be transmitted (step S109). Even when no commodities 5 are stolen (step S107—NO), the unauthenticated intruder alarm may be given until no unauthenticated persons are confirmed in the trunk 7 (step S110—YES).

Figure 7:
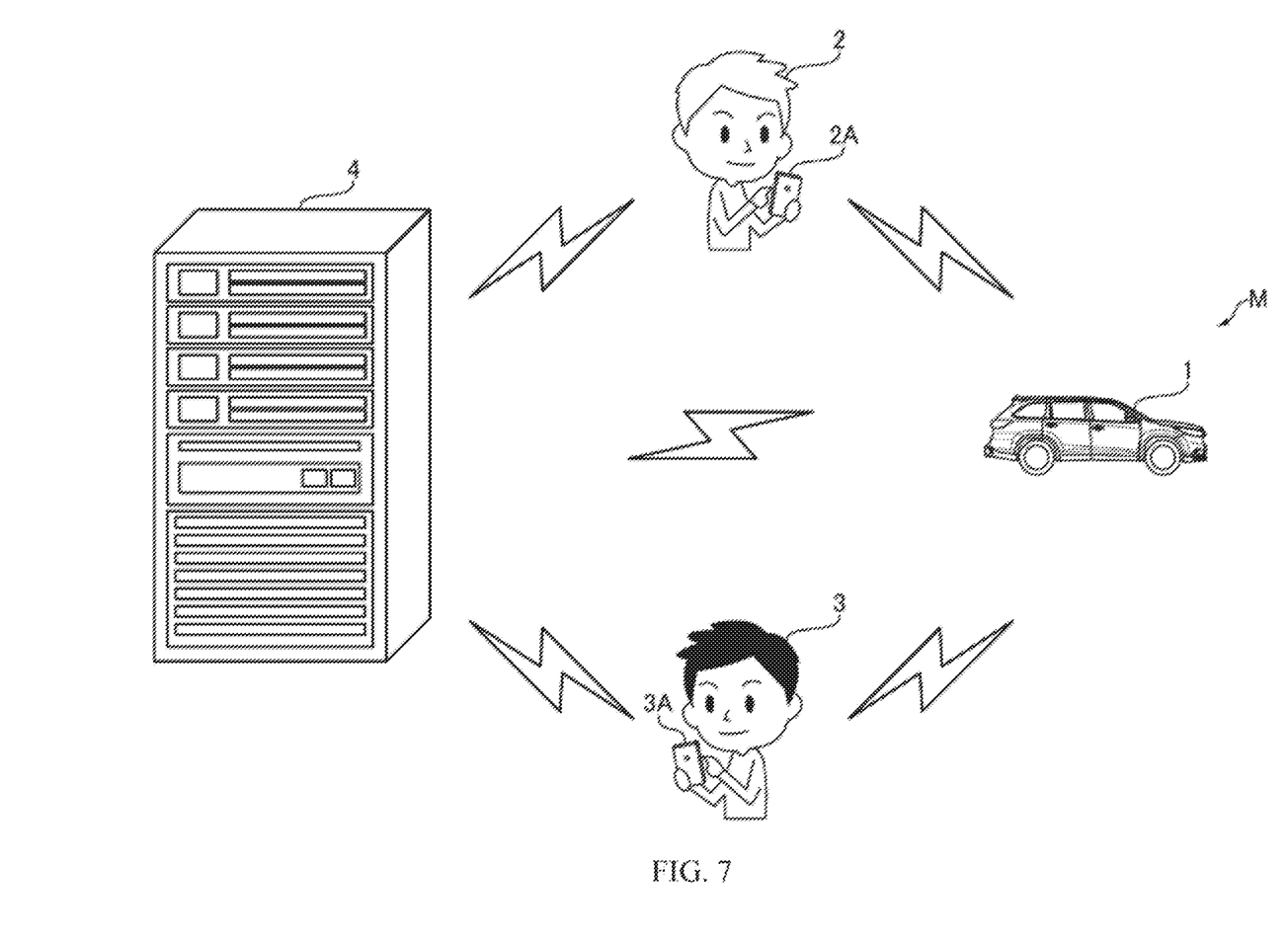
FIG. 7 illustrates a use form of the unattended selling assistance system according to the embodiment of the disclosure.

FIG. 7 illustrates a use form of the unattended selling assistance system M. In using the unattended selling assistance system M, the vehicle 1 equipped with the unattended selling assistance ECU 10, the information terminal 3A carried by the vendor 3, the information terminal 2A carried by the purchaser 2, and the unattended selling assistance system server 4 may communicate with one another. The unattended selling assistance system server 4 may manage registered data.

In the unattended selling, the vendor 3 may perform the commodity registration. The commodity registration may include registering, in the unattended selling assistance system M, the commodity data regarding the commodities 5 and positional data regarding the vehicle 1 for the selling of the commodities 5. The commodity data regarding the commodities 5 may include, for example, the names, the prices, and the appearances of the commodities 5 to be sold. These pieces of the registered data may be updated every time. The data regarding the commodities 5 to be sold and the positional data may be updated each time the commodities 5 are sold. In consideration of disturbance to the vicinity of the vendor's house, the place for the unattended selling may be, for example, a parking lot such as a coin-operated parking lot, or a road on which parking is permitted, instead of a parking lot at the vendor's house. The data registered in the commodity registration may be held in a storage of the unattended selling assistance ECU 10, and also managed by the unattended selling assistance system server 4. Moreover, the data registered in the commodity registration may be disclosed by the unattended selling assistance system server 4 for a browse on a dedicated application or a website. In addition, the vendor 3 may announce the commodities 5 to be sold or the positional data by using, for example, a social networking service (SNS). The purchaser 2 may have a browse on the dedicated application, the website, or the SNS, and acquire information regarding the commodities 5 and a location of the selling.

When purchasing the commodities 5, the purchaser 2 may perform purchaser data registration. The purchaser data registration may include registering personal information regarding the purchaser 2 and setting of a settlement method necessary for purchase of the commodities 5. The personal information may include, for example, the name, the age, a face image, and an address of the purchaser 2. The purchaser data registration may be performed on the dedicated application or the website. The data registered in the purchaser data registration may be managed by the unattended selling assistance system server 4.

The purchaser 2 may obtain the information through the application, the website, and the SNS and come to the vehicle 1. The door lock device 51 of the vehicle 1 is in a lock state, and it is impossible for a person other than registered persons to unlock the vehicle 1. In the unattended selling assistance system M of this embodiment, the purchaser 2 whose purchaser data has been successfully authenticated may be temporarily permitted to unlock the vehicle 1, making it possible for the purchaser 2 to open the trunk door 6. The vehicle 1 may establish wireless communication with the information terminal 2A carried by the purchaser 2 by using the second communication device 32, and authenticate the purchaser data. Details of the authentication of the purchaser data are described later with reference to a flowchart in FIG. 9. When the authentication of the purchaser data is ended, the door lock device 51 may be brought to an unlock state, making it possible for the purchaser 2 whose purchaser data has been successfully authenticated to open the trunk door 6 and purchase the commodities 5 placed in the trunk 7.

Figure 8:
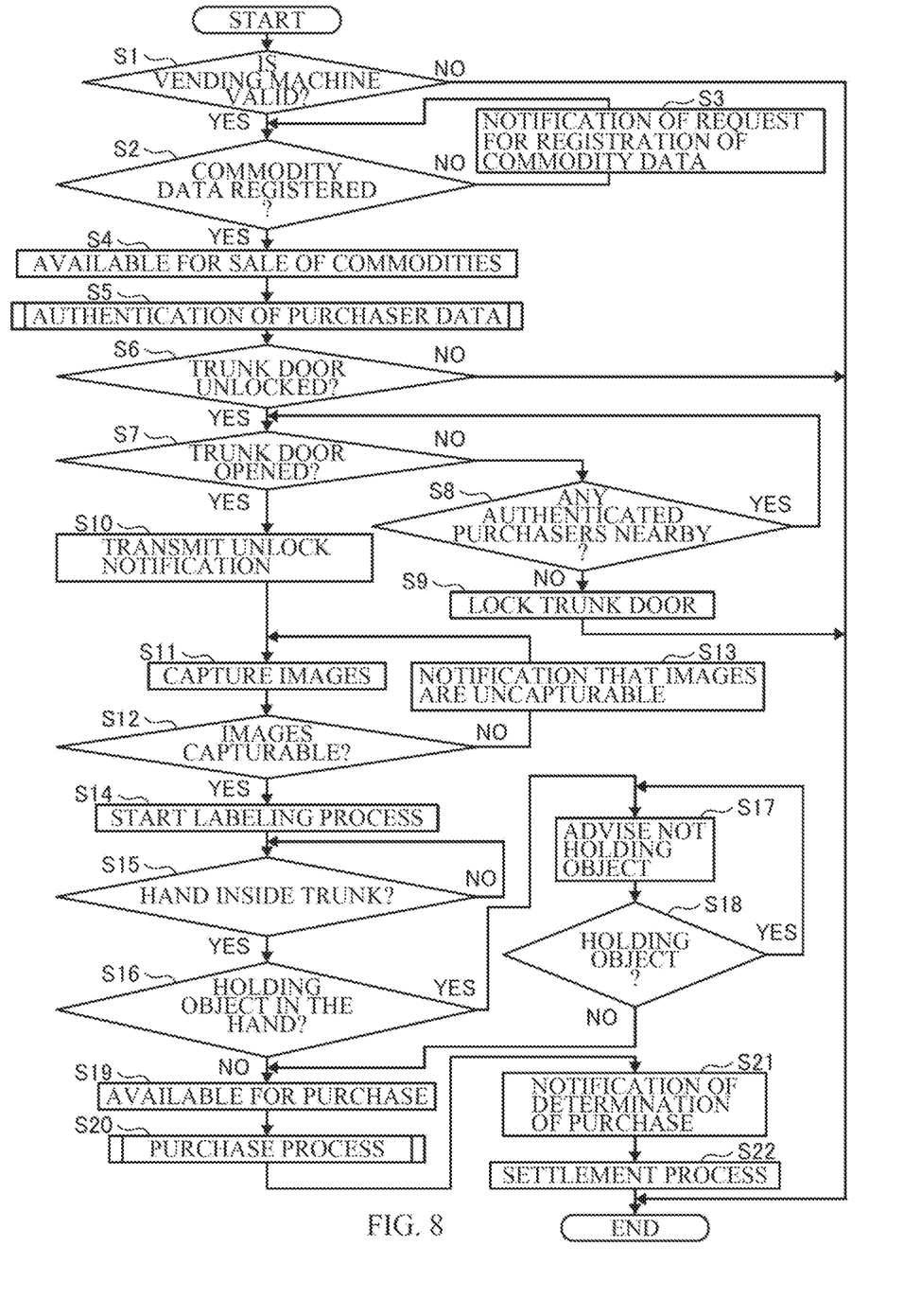
FIG. 8 is a flowchart of processing by the unattended selling assistance system according to the embodiment of the disclosure.

Description is given next, with reference to FIG. 8, of processing by the unattended selling assistance system M. First, in performing the unattended selling, the unattended selling assistance system M may check whether or not an unattended vending machine is valid in the vehicle 1 (step S1). When the unattended vending machine is invalid, it is assumed that, for example, there is a malfunction in the in-vehicle devices and the in-vehicle ECUs indispensable for the unattended selling, e.g., the vehicle mounted cameras and the camera ECU 20, the in-vehicle communication devices and the communication ECU 30, and the speaker 41, the display device 42, and the notification ECU 40 (step S1—NO). When the in-vehicle devices and the in-vehicle ECUs are in normal operation, the unattended selling assistance system M may determine that the unattended vending machine is valid, and cause the flow to proceed (step S1—YES).

When determining that the unattended vending machine is valid, the unattended selling assistance system M may check whether or not the commodity data has been registered (step S2). When the commodity data has not been registered (step S2—NO), the unattended selling assistance system M may request the registration of the commodity data (step S3). When the commodity data has been normally registered (step S2—YES), the unattended selling assistance system M may determine that the vehicle 1 is available for sale of the commodities (step S4).

When determining that the vehicle 1 is available for the sale of the commodities, the unattended selling assistance system M may authenticate the purchaser data (step S5). The purchaser data may be authenticated based on the data acquired by wireless communication established between the second communication device 32 of the vehicle 1 and the information terminal 2A carried by the purchaser 2. Detailed processing of the authentication of the purchaser data is described later with reference to the flowchart in FIG. 9. When the purchaser data is successfully authenticated, the unattended selling assistance system M may unlock the trunk door 6 of the vehicle 1 by the door lock device 51 (step S6—YES). When the authentication of the purchaser data fails, the unattended selling assistance system M may refrain from unlocking the trunk door 6 (step S6—NO).

When the trunk door 6 is unlocked and the trunk door 6 is opened (step S7—YES), the unattended selling assistance system M may transmit an unlock notification to the information terminal 3A of the vendor 3, i.e., the owner of the vehicle 1 (step S10). With this notification, the vendor 3 may recognize that the trunk door 6 of the vehicle 1 is unlocked and the trunk door 6 is opened by the purchaser 2. Moreover, when the trunk door 6 is unlocked but the trunk door 6 is not opened by the purchaser 2 (step S7—NO), the unattended selling assistance system M may check presence or absence of the purchaser 2 whose purchaser data has been successfully authenticated, around the vehicle 1 by using the second communication device 32 (step S8). When the unattended selling assistance system M does not confirm the presence of the purchaser 2 whose purchaser data has been successfully authenticated, around the vehicle 1 (step S8—NO), the trunk door 6 may be locked again by the door lock device 51 (step S9).

When the trunk door 6 is unlocked and the trunk door 6 is opened, the trunk camera 21, the aperture camera 22, and the perimeter camera 23 of the vehicle 1 may each start to capture the images (step S11). When the images are capturable (step S12—YES), the identification unit 103 may perform the labeling process by using the image data captured by each of the vehicle mounted cameras (step S14). In contrast, for example, when the face of the purchaser 2 is hidden by a hat, a mask, etc. and is not accurately identifiable (step S12—NO), a notification is given to advise taking off the hat, the mask, etc., by using the speaker 41, the display device 42, or both (step S13).

When the labeling process is carried out, the identification unit 103 may identify whether or not the hand of the purchaser 2 is inside the trunk 7 (step S15). When identifying the hand of the purchaser 2 being inside the trunk 7 (step S15—YES), the identification unit 103 may identify whether or not the hand is holding an object (step S16). When the purchaser 2 gets the hand into the trunk 7 while holding a handbag, the information terminal 2A, etc., there is possibility of a malfunction of the identification unit 103. Accordingly, when the purchaser 2 gets the hand into the trunk 7 while holding an object (step S16—YES), a notification may be given to advise not holding the object (step S17). The notification to advise not holding the object may be given by, for example, a notification by the speaker 41, the display device 42, or both, or a notification to the information terminal 2A of the purchaser 2. The notification to advise not holding the object may be given (step S18—YES) until the purchaser 2 releases the object the purchaser 2 is holding.

When the purchaser 2 does not hold any objects in the hand (step S16—NO) or when the purchaser 2 releases the object the purchaser 2 is holding (step S18—NO), the commodities 5 are available for purchase (step S19). Thus, the unattended selling assistance system M may carry out a purchase process (step S20). Details of the purchase process are described later with reference to a flowchart of the purchase process in FIG. 10. When the purchase process is ended, a notification of determination of purchase may be transmitted to the information terminal 3A of the vendor 3, i.e., the owner of the vehicle 1, and the information terminal 2A of the purchaser 2 (step S21). The notification of the determination of the purchase may be a notification that the purchase of the commodity has been confirmed. The contents of the notification of the determination of the purchase may include, for example, the time of the purchase of the commodity, and the data regarding the commodity.

After transmitting the notification of the determination of the purchase, the unattended selling assistance system M may carry out a settlement process (step S22). The settlement process may be a process of calculating the price of the commodity 5 purchased, carrying out the settlement process based on the calculated price, and transmitting a notification of settlement to the information terminal 3A of the vendor 3 and the information terminal 2A of the purchaser 2. When the settlement process is ended, the processing by the unattended selling assistance system M may be ended.

Figure 9:
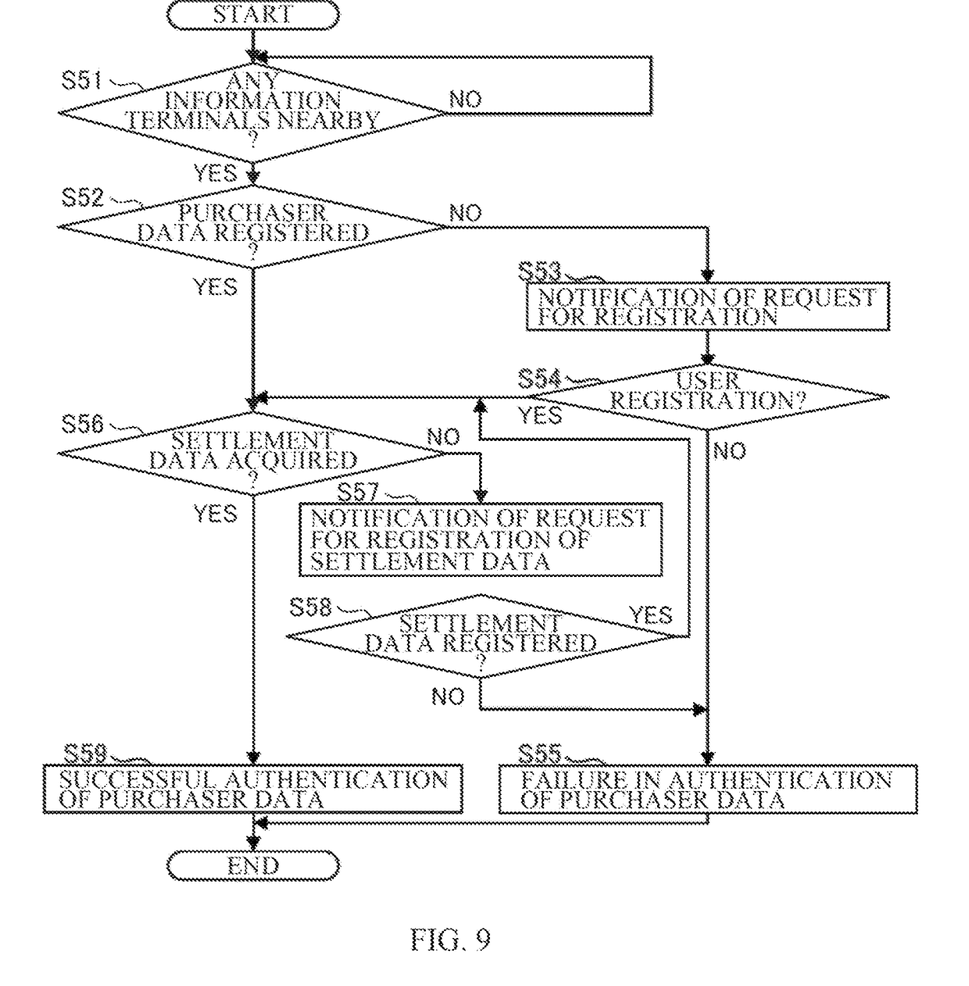
FIG. 9 is a flowchart of a process of authentication of purchaser data by the unattended selling assistance system according to the embodiment of the disclosure.

Description is given next, with reference to FIG. 9, of the authentication of the purchaser data in step S5 in FIG. 8. As described, the purchaser data may be authenticated by wireless communication between the second communication device 32 of the vehicle 1 and the information terminal 2A carried by the purchaser 2.

First, the vehicle 1 may search the surroundings of the vehicle 1 for an information terminal (step S51). When detecting the information terminal 2A of the purchaser 2 around the vehicle 1 (step S51—YES), the vehicle 1 may communicate with the information terminal 2A by using wireless communication by the second communication device 32 to confirm the registration of the purchaser data (step S52). The registration of the purchaser data may be confirmed by transmitting the data acquired from the information terminal 2A to the unattended selling assistance system server 4 by the first communication device 31, and comparing the data with the purchaser data managed by the unattended selling assistance system server 4.

When the registration of the purchaser data is confirmed (step S52—YES), the flow may be caused to proceed to acquisition of settlement data (step S56). The acquisition of the settlement data may include acquiring the settlement data to be used in the purchase of the commodity 5 in the unattended selling assistance system M. The settlement data may be registered in the dedicated application, etc. by the purchaser 2. The vehicle 1 may check whether or not the registered settlement method is in a settleable state and acquire the settlement data. When the settlement data contains deficiencies (step S56—NO), a notification of a request for registration of the settlement data may be transmitted to the information terminal 2A of the purchaser 2 (step S57). Thereafter, when no settleable settlement data is registered (step S58—NO), the authentication of the purchaser data may end in a failure (step S55). When the acquisition of the settlement data is ended (step S56—YES), the authentication of the purchaser data may be successfully ended (step S59).

When the registration of the purchaser data is not confirmed (step S52—NO), a notification of a request for the registration of the purchaser data may be transmitted to the information terminal 2A of the purchaser 2 (step S53). The notification of the request for the registration may be given to, for example, a membership page of the dedicated application installed in the information terminal 2A or the website. This prevents a person around the vehicle 1 who carries an information terminal without any intention for the purchase from receiving the notification. When the registration of the purchaser data is confirmed (step S54—YES), the flow may be caused to proceed to the acquisition of the settlement data (step S56). When the registration of the purchaser data is not confirmed (step S54-NO), the authentication of the purchaser data may end in a failure (step S55), and the authentication process of the purchaser data may be ended.

Figure 10:
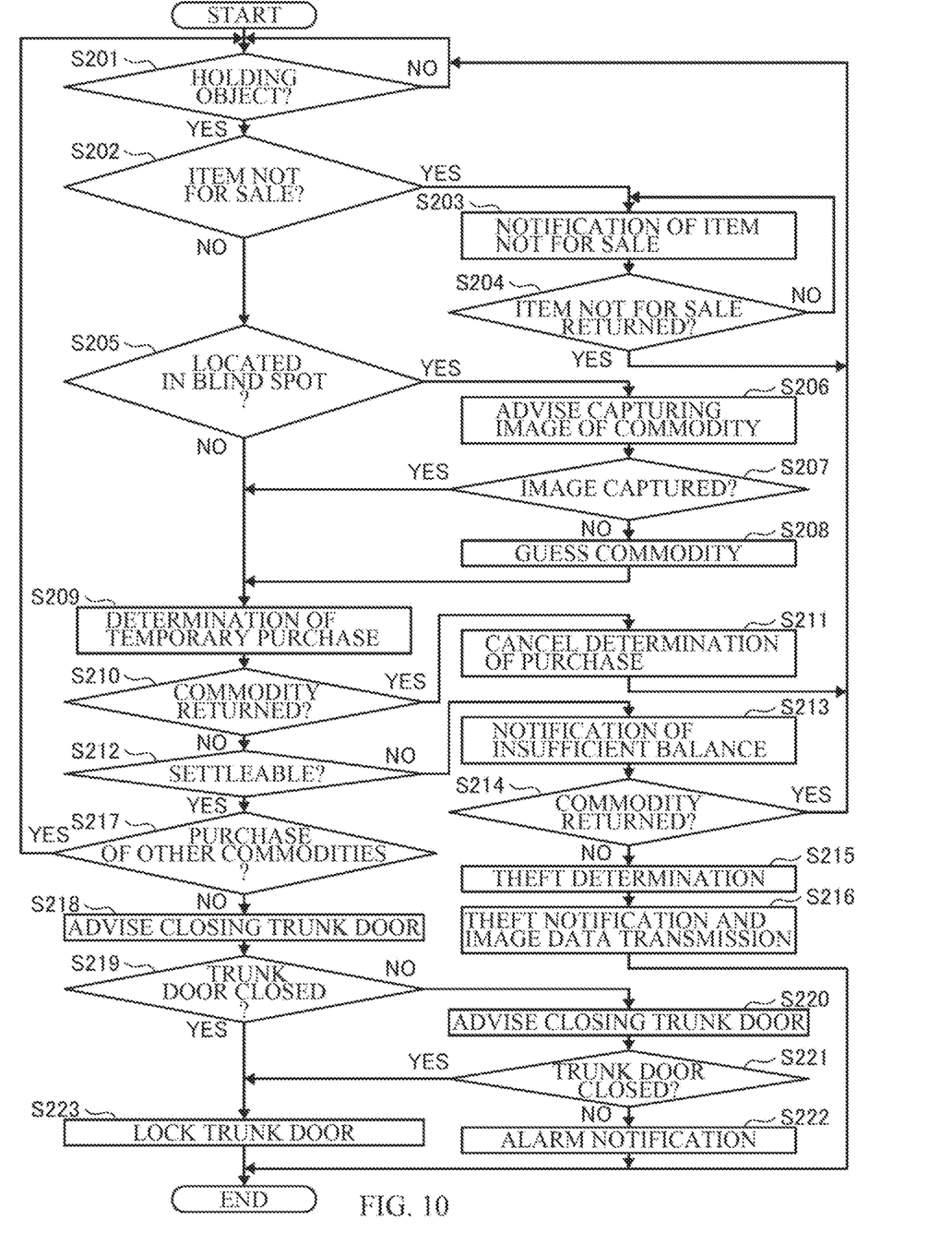
FIG. 10 is a flowchart of a purchase process by the unattended selling assistance system according to the embodiment of the disclosure.

Description is given next, with reference to FIG. 10, of the purchase process in step S20 in FIG. 8. As described, the purchase process may be carried out when the purchaser 2 is not holding any objects in the hand (step S16—NO) or when the purchaser 2 releases the object the purchaser 2 is holding (step S18—NO).

First, the identification unit 103 may identify whether or not the purchaser 2 is holding an object, with the use of the image data (step S201). When identifying the purchaser 2 as holding an object (step S201—YES), the identification unit 103 may identify whether or not the held object is an item not for sale (step S202). The identification as to whether the held object is an item not for sale may be made based on the data regarding the commodity registration held in the storage 14 of the unattended selling assistance ECU 10 and the image data acquired by the data acquisition unit 100. Moreover, the trunk camera 21 may be also capturing the movements of the hand of the purchaser 2, making it possible to guess what the held object is, based on a locus of the movements of the hand of the purchaser 2. When the identification unit 103 identifies the held object as an item not for sale (step S202—YES), a notification of an item not for sale may be given (step S203). The notification of the item not for sale may be given, by a notification with the use of the speaker 41, the display device 42, or both of the vehicle 1, or by a notification to the information terminal 2A of the purchaser 2. The notification of the item not for sale may be given until the purchaser 2 returns the item not for sale to the trunk 7 (step S204—NO).

When the held object is not an item not for sale, that is, when the identification unit 103 identifies the held object as the commodity 5 (step 202—NO), the identification unit 103 may identify whether the held object is located in a blind spot for the vehicle mounted cameras, that is, whether the commodity 5A held by the purchaser 2 is accurately identifiable (step S205). When the held commodity 5A is not accurately identifiable based on the image data acquired by the image data acquirer 101 (step S205—YES), a notification may be given to advise capturing an image of the commodity (step S206). The notification to advise capturing the image of the commodity may be given, for example, by a notification with the use of the speaker 41, the display device 42, or both, or by a notification to the information terminal 2A of the purchaser 2. After the notification to advise capturing the image of the commodity, when it is difficult to identify the held commodity 5A because, for example, the purchaser does not follow the advice in the notification (step S207—NO), the identification unit 103 may guess what the held commodity 5A is (step S208). In guessing what the commodity 5A is, the image data captured by each of the vehicle mounted cameras may be compared with the commodity data registered in the commodity registration, to guess a commodity having the same feature to be the commodity 5A, even if the commodity 5A is not perfectly identifiable. Moreover, as described, the trunk camera 21 may be also capturing the movements of the hand of the purchaser 2, making it possible to guess what the held commodity 5A is, based on the locus of the movements of the hand of the purchaser 2. After guessing what the held commodity 5A is, the flow may be caused to proceed to a determination of temporary purchase, assuming an intention to purchase the commodity 5A (step S209). When the held commodity 5A is not located in the blind spot for the vehicle mounted cameras (step S205—NO), or when the image of the held commodity 5A has been captured in accordance with the notification to advise capturing the image of the commodity (step S207—YES), the flow may be caused to proceed to the determination of the temporary purchase. On the occasion of the determination of the temporary purchase, a notification of, for example, the name and the price of the commodity 5A may be given with the use of the speaker 41, the display device 42, or both.

After the determination of the temporary purchase, when the commodity 5A is returned to the trunk 7 (step S210—YES), the determination of the temporary purchase may be cancelled (step S211). When the commodity 5A is not returned to the trunk 7 (step S210—NO), a determination may be made as to whether the commodity 5A related to the determination of the temporary purchase is settleable (step S212). The determination as to whether or not the commodity 5A is settleable may be made by referring to the settlement data acquired on the occasion of the authentication of the purchaser data. When the commodity 5A is not settleable because of insufficient balance (step S212—NO), a notification of insufficient balance may be given (step S213). The notification of the insufficient balance may be given with the use of the speaker 41, the display device 42, or both. After the notification of the insufficient balance, when the commodity 5A is not returned (step S214—NO), a theft determination may be made, assuming that the commodity 5A has been stolen (step S215). Thus, the theft notification may be given with the use of the first communication device 31 to the information terminal 3A of the vendor 3, i.e., the owner of the vehicle 1, the manager of the unattended selling assistance system M, and the public organization, while the image data captured by each of the vehicle mounted cameras at this occasion may be transmitted (step S216).

When determining that the commodity 5A is settleable, by referring to the settlement data (step S212—YES), a notification may be given, to advise confirming an intention to purchase other commodities 5 (step S217—YES). When the intention to purchase other commodities 5 is not confirmed (step S217—NO), a notification may be given to advise closing the trunk door (step S218). When the trunk door 6 is closed (step S219—YES), the trunk door 6 of the vehicle 1 may be locked (step S223), and the purchase process may be ended. After the notification to advise closing the trunk door, when the trunk door 6 is not closed (step S219—NO), a notification may be given again to advise closing the trunk door (step S220). Thereafter, when the trunk door 6 is not closed (step S221—NO), an alarm notification may be given (step S222), and the purchase process may be ended. Possible examples of the alarm notification may include a notification that notifies the information terminal 3A of the vendor 3, i.e., the owner of the vehicle 1, that the trunk door 6 is not closed, or a notification that notifies the manager of the unattended selling assistance system M of the data regarding the purchaser 2 who has not closed the trunk door 6. Moreover, when the vehicle 1 is a vehicle adapted to automatic closing of the trunk door 6, automatic locking may be made after the alarm notification, and the purchase process may be ended.

The notification of the determination of the purchase in step S21 in FIG. 8 may be basically caused by the locking of the trunk door 6. That is, the purchase of the commodity may be confirmed by the locking of the trunk door 6. Moreover, when the vehicle 1 is a vehicle unadapted to the automatic closing of the trunk door 6, the notification of the determination of the purchase may be also given when the trunk door 6 remains unlocked for a predetermined period of time after the alarm notification.

In the forgoing description, the identification of the commodity 5A is made by allowing the identification unit 103 to identify the image data captured by the vehicle mounted cameras. However, the identification may be made by providing the vehicle mounted cameras with a reader configured to read, for example, a radio frequency identification (RFID) tag or a two-dimensional code, and allowing the reader to read the RFID tag or the two-dimensional code. Moreover, because the identification of the commodity is performed when the purchaser 2 holds the commodity, it is not necessary for the commodities to be arranged neatly.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

According to the aspects of the disclosure, it is possible to perform unattended selling of commodities accommodated by a vehicle, with the use of the vehicle owned by an owner themselves, while ensuring security of the commodities and purchasers, without incurring an excessive capital investment to the owner of the vehicle.

The unattended selling assistance ECU 10 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the unattended selling assistance ECU 10. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the unattended selling assistance ECU 10 illustrated in FIG. 1.

The invention claimed is:

1. An unattended commodity selling assistance system using a vehicle, the vehicle comprising:
   a trunk configured to provide room for a commodity;
   one or more vehicle mounted cameras configured to capture an image of a surrounding view of the vehicle and an image of an inside view of the trunk;
   an image data acquisition unit configured to acquire image data on the image captured by the one or more vehicle mounted cameras;
   an identification unit configured to process the image data to determine attributes of persons or objects depicted in the image data, including one or more of:
      determining whether a person is a purchaser whose purchaser data has been authenticated or an intruder whose purchaser data has not been authenticated,
      identifying whether the commodity is being stolen by the intruder, and
      associating the object with the person holding the object;
   a notification unit configured to give a notification to a person in or around the trunk; and
   a communication device configured to communicate with outside the vehicle,
   wherein, in response to a trunk door of the vehicle being opened, the vehicle enters an alert state in which:
      the notification unit is configured to, in response to the identification unit determining the intruder as being present in the trunk, give an intruder alarm notification, and
      the communication device is configured to, in response to the identification unit determining the commodity as being stolen by the intruder, give a theft notification to a public organization.

2. The unattended commodity selling assistance system using the vehicle according to claim 1, wherein
   the notification unit is configured to, on a condition that the identification unit identifies any risk as being present around the purchaser, give an alarm notification.

3. The unattended commodity selling assistance system using the vehicle according to claim 1, wherein the one or more vehicle mounted cameras include:
   a trunk camera disposed to capture images of the commodity in the trunk and movements of a hand of the person when the person reaches into the trunk; and
   an aperture camera disposed near an opening of the trunk to capture images of the person and surroundings of the person, the aperture camera being further oriented to capture a portion of the trunk from an angle different from that of the trunk camera to capture the commodity held by the purchaser, the aperture camera being further configured to capture rearward images behind the purchaser to detect a potential danger approaching from behind the purchaser.

4. An unattended commodity selling assistance system using a vehicle, the vehicle comprising
   a trunk configured to provide room for a commodity,
   one or more vehicle mounted cameras configured to capture an image of a surrounding view of the vehicle and an image of an inside view of the trunk, and
   circuitry configured to:
      acquire image data on the image captured by the one or more vehicle mounted cameras;
      process the image data to determine attributes of persons or objects depicted in the image data, including one or more of:
         determining whether a person is a purchaser whose purchaser data has been authenticated or an intruder whose purchaser data has not been authenticated,
         identifying whether the commodity is being stolen by the intruder, and
         associating the object with the person holding the object;
      cause a notification unit to give a notification to a person in or around the trunk; and
      cause a communication device to communicate with outside the vehicle,
   wherein, in response to a trunk door of the vehicle being opened, the vehicle enters an alert state in which:
      the circuitry is configured to, when identifying an intruder other than a purchaser as being present in the trunk, cause the notification unit to give an intruder alarm notification, and
      the circuitry is configured to, when identifying the commodity as being stolen by the intruder, cause the communication device to give a theft notification to a public organization.

5. The unattended commodity selling assistance system using the vehicle according to claim 4, wherein the one or more vehicle mounted cameras include:

a trunk camera disposed to capture images of the commodity in the trunk and movements of a hand of the person when the person reaches into the trunk; and an aperture camera disposed near an opening of the trunk to capture images of the person and surroundings of the person, the aperture camera being further oriented to capture a portion of the trunk from an angle different from that of the trunk camera to capture the commodity held by the purchaser, the aperture camera being further configured to capture rearward images behind the purchaser to detect a potential danger approaching from behind the purchaser.

\* \* \* \* \*